United States Patent
Mielczarek et al.

(10) Patent No.: US 7,747,922 B2
(45) Date of Patent: Jun. 29, 2010

(54) ADAPTIVE HYBRID ARQ SYSTEMS WITH BCJR DECODING

(75) Inventors: Bartosz Mielczarek, Edmonton (CA); Witold A Krzymien, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 1029 days.

(21) Appl. No.: 11/445,608

(22) Filed: Jun. 1, 2006

(65) Prior Publication Data
US 2007/0016838 A1   Jan. 18, 2007

Related U.S. Application Data (60) Provisional application No. 60/686,511, filed on Jun. 1, 2005.

(51) Int. Cl.
*G08C 25/02* (2006.01)
(52) U.S. Cl. .................................. 714/748
(58) Field of Classification Search .......... 714/748, 714/795, 746, 758, 776, 792, 800; 375/262, 375/341
See application file for complete search history.

(56) References Cited

U.S. PATENT DOCUMENTS 7,246,297 B2 * 7/2007 Zarrinkhat et al. .......... 714/755

OTHER PUBLICATIONS

Açikel, Ö.F., and W.E. Ryan, "Punctured Turbo-Codes for BPSK/QPSK Channels," IEEE Transactions on Communications 47(9):1315-1323, Sep. 1999.

Babich, F., et al., "Some Notes on Rate-Compatible Punctured Turbo Codes (RCPTC) Design," IEEE Transactions on Communications 52(5):681-684, May 2004.
Bahl, L.R., et al., "Optimal Decoding of Linear Codes for Minimizing Symbol Error Rate," IEEE Transactions on Information Theory 20(2):284-287, Mar. 1974.
Benedetto, S., et al., "A Search for Good Convolutional Codes to Be Used in the Construction of Turbo Codes," IEEE Transactions for Communications 46(9):1101-1105, Sep. 1998.
Berrou, C., and A. Glavieux, "Near Optimum Error Correcting Coding and Decoding: Turbo-Codes," IEEE Transactions on Communications 44(10):1261-1271, Oct. 1996.
Berrou, C., et al., "Near Shannon Limit Error—Correcting Coding and Decoding: Turbo-Codes(1)," IEEE Conference on Communications 2:1064-1070, May 1993.
Chung, S.T., and A.J. Goldsmith, "Degrees of Freedom in Adaptive Modulation: A Unified View," IEE Transactions on Communications 49(9):1561-1571, Sep. 2001.
Dahlman, E., et al., "WCDMA—The Radio Interface for Future Mobile Multimedia Communications," IEEE Transactions on Vehicular Technology 47(4):1105-1118, Nov. 1998.

(Continued)

*Primary Examiner*—Phung M Chung
(74) *Attorney, Agent, or Firm*—Christensen O'Connor Johnson Kindness PLLC (57) ABSTRACT

A method and an apparatus of constructing hybrid Automatic Repeat reQuest (ARQ) systems using specific properties of the BCJR error correcting algorithm. Since the convergence to an actual codeword is not always guaranteed with the BCJR, the method and apparatus implements a system, in which two different types of Negative AcKnowledgement messages (NAKs) are employed. The first type is the conventional one-bit NAK and the second type specifies retransmission pattern in such a way that the additional parity bits are concentrated on the parts of the code trellis that did not converge to a valid sequence.

19 Claims, 6 Drawing Sheets

OTHER PUBLICATIONS

Hagenauer, J., "Rate-Compatible Punctured Convolutional Codes (RCPC Codes) and Their Applications," IEEE Transactions on Communications 36(4):389-400, Apr. 1988.

Kim, H., and J.M. Shea, "New Turbo-ARQ Techniques Based on Estimated Reliabilities," IEEE Wireless Communications and Networking Conference 2:843-848, Mar. 2003.

Love, R., et al., "Performance of 3GPP High Speed Downlink Packet Access (HSDPA)," IEEE 60th Vehicular Technology Conference 5:3359-3363, Sep. 2004.

Mielczarek, B., and A. Svensson, "Timing Error Recovery in Turbo-Coded Systems on AWGN Channels," IEEE Transactions on Communications 50(10):1584-1592, Oct. 2002.

Mielczarek, B., and W. Krzymień, "Convergence Focused Construction of Hybrid ARQ Systems With Turbo Codes," IEEE International Conference on Communications 1:351-355, Jun. 2004.

Oteng-Amoako, K., et al., "Turbo Punctured Hybrid-ARQ Strategies Over OFDM Systems," International Workshop on Ultra Wideband Systems, May 2004, pp. 212-216.

Rowitch, D.N., and L.B. Milstein, "On the Performance of Hybrid FEC/ARQ Systems Using Rate Compatible Punctured Turbo (RCPT) Codes," IEEE Transactions on Communications 48(6):948-959, Jun. 2000.

Takeshita, O.Y., et al., "On the Frame-Error Rate of Concatenated Turbo Codes," IEEE Transactions on Communications 49(4):602-608, Apr. 2001.

"Telemetry Channel Coding," CCSDS 101.0-B-4, Blue Book, Consultative Committee for Space Data Systems [CCSDS], May 1999, 46 pages.

Ten Brink, S., "Convergence Behavior of Iteratively Decoded Parallel Concatenated Codes," IEE Transactions on Communications 49(10):1727-1737, Oct. 2001.

Uhlemann, E., et al., "Packet Combining and Doping in Concatenated Hybrid ARQ Schemes Using Iterative Decoding," IEEE Wireless Communications and Networking Conference 2:849-854, Mar. 2003.

"Universal Mobile Telecommunications System (UMTS): Multiplexing and Channel Coding (FDD) (3GPP TS 25.212 Version 3.4.0 Release 1999)," Technical Specification ETSI TS 125 212 V3.4.0, European Telecommunications Standards Institute (ETSI) 3rd Generation Partnership Project (3GPP), Sophia Antipolis, France, Sep. 2009, 64 pages.

Woodward, J.P., and L. Hanzo, "Comparative Study of Turbo Decoding Techniques: An Overview," IEEE Transactions on Vehicular Technology 49(6):2208-2233, Nov. 2000.

Zhou, Y.Q. and J. Wang, "Optimum Sub-Packet Transmission for Turbo-coded Hybrid ARQ Systems," IEEE International Conference on Communications 5:3080-3084, May 2003.

* cited by examiner

*1) After first ML NAK*

*2) After first CONVERGENCE NAK*

*3) After second CONVERGENCE NAK*

*4) After second ML NAK*

ADAPTIVE HYBRID ARQ SYSTEMS WITH BCJR DECODING

CROSS-REFERENCE TO RELATED APPLICATIONS

This application claims the benefit under 35 USC 119 of provisional patent application No. 60/686,511 filed Jun. 1, 2005.

BACKGROUND

In modem wireless communication systems, the increasing demand for higher bit rates is not easily accommodated by the available RF spectrum. Thus, the successful designs of transmission systems may no longer be aimed at providing redundancy for the 'worst case' channels but instead must be able to track quality of the link and adjust the transmission rate accordingly. In cellular systems, the problem of approaching channel capacity is rendered even more complex by interference caused by users transmitting their signals simultaneously. The problem with interference is that, in general, it is very difficult to predict its level. Hence, even if the transmitter knows the channel state perfectly at the beginning of transmission and maximizes throughput by changing the code rate accordingly, an instant increase of the interference power may render the signal undecodable.

One of the ways of dealing with this issue is to use a hybrid Automatic Repeat reQuest (HARQ) approach. An information block is first appended with the cyclic redundancy check (CRC) code, which is used for error detection and then encoded using the forward error correction (FEC). Using this approach, it is possible to detect possible errors in a frame and request additional retransmissions to provide the receiver with enough extra information to successfully decode the frame. In principle, there are two types of HARQ algorithms. In Type-I hybrid ARQ, the received packet is discarded after a negative CRC check and the whole packet is retransmitted. In Type-II, the techniques of soft packet combining and incremental redundancy (IR) are employed, which use both the currently retransmitted packet and previously received ones. In order to ensure high spectral efficiency of packet transmissions, Type-II is usually preferred since, with this approach, shorter blocks with additional code bits are needed for reliable transmission of the data and channel is used in a better way than in Type-I.

One method for decoding FEC codes in Type-II HARQ IR systems uses the bit-wise maximum a-posteriori (MAP) optimal BCJR (Bahl-Cocke-Jelinek-Raviv) algorithm. The BCJR algorithm can be used to decode all codes that can be represented by a trellis, but it is mainly used in component decoders of turbo codes and widely implemented in many existing deep space and 3 G cellular telephony systems. The BCJR algorithm can also be used to decode convolutional codes.

The most typical approach to designing HARQ systems is to create a set of rate compatible (RC) codes, which allows to gradually decrease the coding rate in subsequent retransmissions. At each rate, the weight spectrum of the given code is optimized according to some criterion, usually related to the maximization of the minimum Hamming distance. In case of turbo codes, the criteria can be more complicated. The BCJR differs from the commonly used Viterbi algorithm since the BCJR does not necessary produce sequences which are valid codewords, while the Viterbi algorithm always converges to an actual codeword (although it is possible that it will be a wrong one).

Since using the BCJR algorithm may result in the decoder converging to the non-codeword solution, any criterion relying purely on Hamming weight may not necessarily be optimal. As a result, if the BCJR algorithm is used, some frames will be not be decoded correctly and will contain convergence errors. Such errors cause lowered reliability of the output, which can be directly coupled to higher incidence of errors.

SUMMARY

A method and apparatus are provided for performing hybrid automatic repeat request (HARQ) transmission within a communication system. In an embodiment of the method, a received frame comprising bits encoded with a trellis code is decoded with forward and backward passes through states of the trellis code to yield a set of probabilities of the states of the trellis code. The frame is then checked for errors, such as with a cylic redundancy check (CRC). If there are errors, such as CRC errors, in the frame, the frame is checked for convergence errors. A convergence error occurs when there is no direct transition between the state with the highest probability of the transitions in the forward pass and the state with the highest probability of the transitions in the backward pass. If a convergence error is found, an additional transmission of bits is requested depending on properties of the convergence errors. In this manner, the embodiment of the method concentrates on the convergence process of the decoder. In one embodiment, the transmitter is provided with information about the erroneously detected parts of the code and uses a sub-block approach to reduce the required feedback throughput. In one embodiment, the algorithm decodes the code before detecting errors in the code. For example, the BCJR (Bahl-Cocke-Jelinek-Raviv) algorithm for maximum a-posteriori (MAP) estimation can be used to decode the code. Hence, lack of convergence of Type-II HARQ systems with the BCJR error correcting algorithm may be used by the HARQ algorithm as additional information about the received codeword.

Thus in one embodiment, a feedback link is used to request additional transmissions of parity bits from the regions of the code trellis with convergence errors. Further, the length of the retransmitted sequences may be adjusted to the actual state of the decoder. Moreover, if more than one bit per transmission is allowed in the feedback link, additional information may be sent to the transmitter that will allow it to choose additional bits in a better way than with the conventional criteria. In part, the algorithm exploits the property of the BCJR algorithm that it does not necessary produce sequences which are valid codewords.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Figure 1:
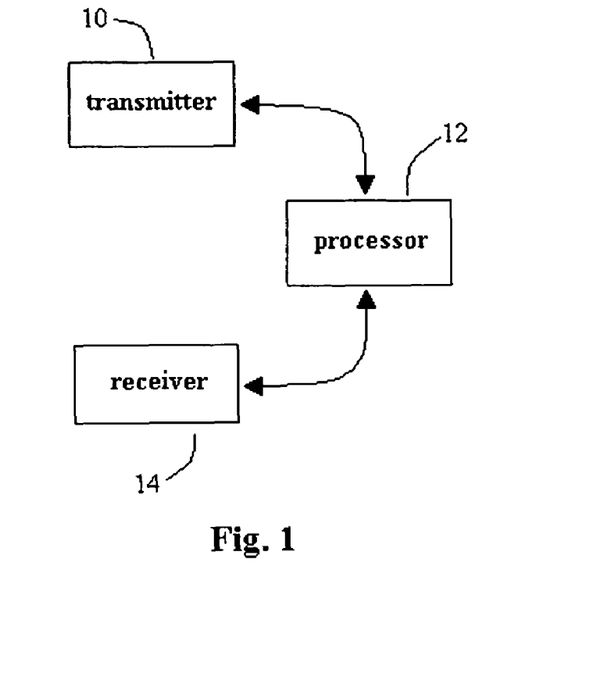
FIG. 1 is a block diagram of a communication system.

A description of the proposed apparatus will now be given with reference to FIG. 1, which includes a transmitter 10, a processor 12 and a receiver 14, which together form part of a communications apparatus that operates within a communications system. The apparatus will communicate with other transceivers within the communications system. The other transceivers will typically incorporate an equivalent transmitter 10, processor 12 and receiver 14. When a part of such other transceiver is referred to, the term "remote" will be used to differentiate it from the communications apparatus whose properties are discussed here. The communications apparatus and the remote transceivers may be fixed or mobile apparatus operating in any communications system. The transmitter 10, in an embodiment of the apparatus, includes a CRC error-detecting outer encoder, an error correcting (inner) encoder and a modulator. In addition, the communications apparatus may be in the presence of a scheduler whose task it is to control the transmission of packets within the communications system. The information bits are first appended with a sequence of CRC check bits, then encoded by the error-correcting encoder and finally transmitted at the time selected by the scheduler. The processor 12 may be any computing apparatus configured to carry out the methods described here.

In one embodiment, error-correcting code can be chosen arbitrarily as long as its decoding can be implemented using the BCJR algorithm or one of its versions (for example Log-MAP) operating on $2^v$ trellis states. In an embodiment, the encoder operates on a block of size N, taking one input bit $x^s_k$ at each encoding step and producing n output bits. The resulting codeword of rate 1/n is then punctured to rate $R_l$ prior to the lth retransmission. For every available rate, the puncturing pattern is defined by an n×p puncturing matrix $P_l$, which contains 1s and 0s indicating the transmitted and punctured bits, respectively. The parameter p is called the puncturing period and specifies the granularity of code rates $R_l$. The encoding is followed by pulse shaping (with pulse energy $E_s$) and modulation. In one embodiment of the method, the modulation is generic binary phase shift keying (BPSK) modulation and the pulse shaping is an ideal Nyquist pulse.

The method and apparatus function over a variety of channel properties and with various packet scheduling algorithms. In an embodiment of the receiver 14, the incoming signal is down-converted to baseband and normalized using the nominal energy $E_s$ per symbol.

Figure 2:
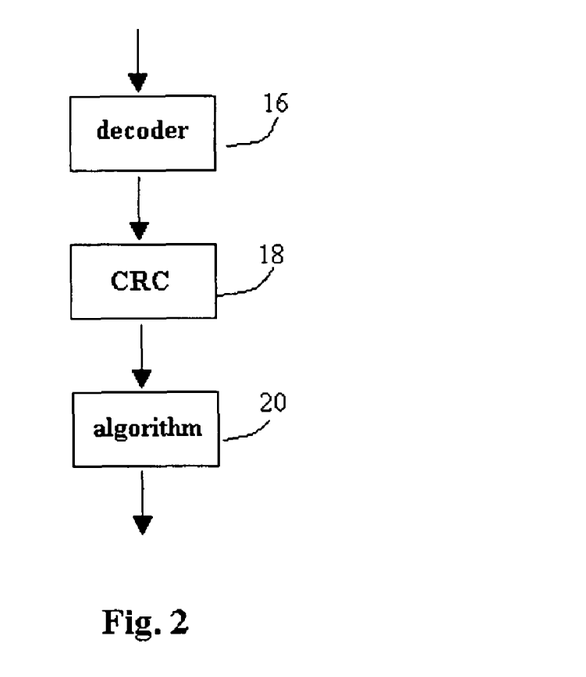
FIG. 2 is a block diagram of a processor within a communication system.

In the processor 12 shown in FIG. 2, an incoming noisy channel signal is fed to the error-correcting decoder 16 employing the BCJR algorithm, which attempts to recover the information bit values of the original transmitted sequence. The decoded packet is then passed to the error-detecting CRC decoder 18, and then the processor 12 checks the integrity of the data in algorithm 20.

Figure 3:
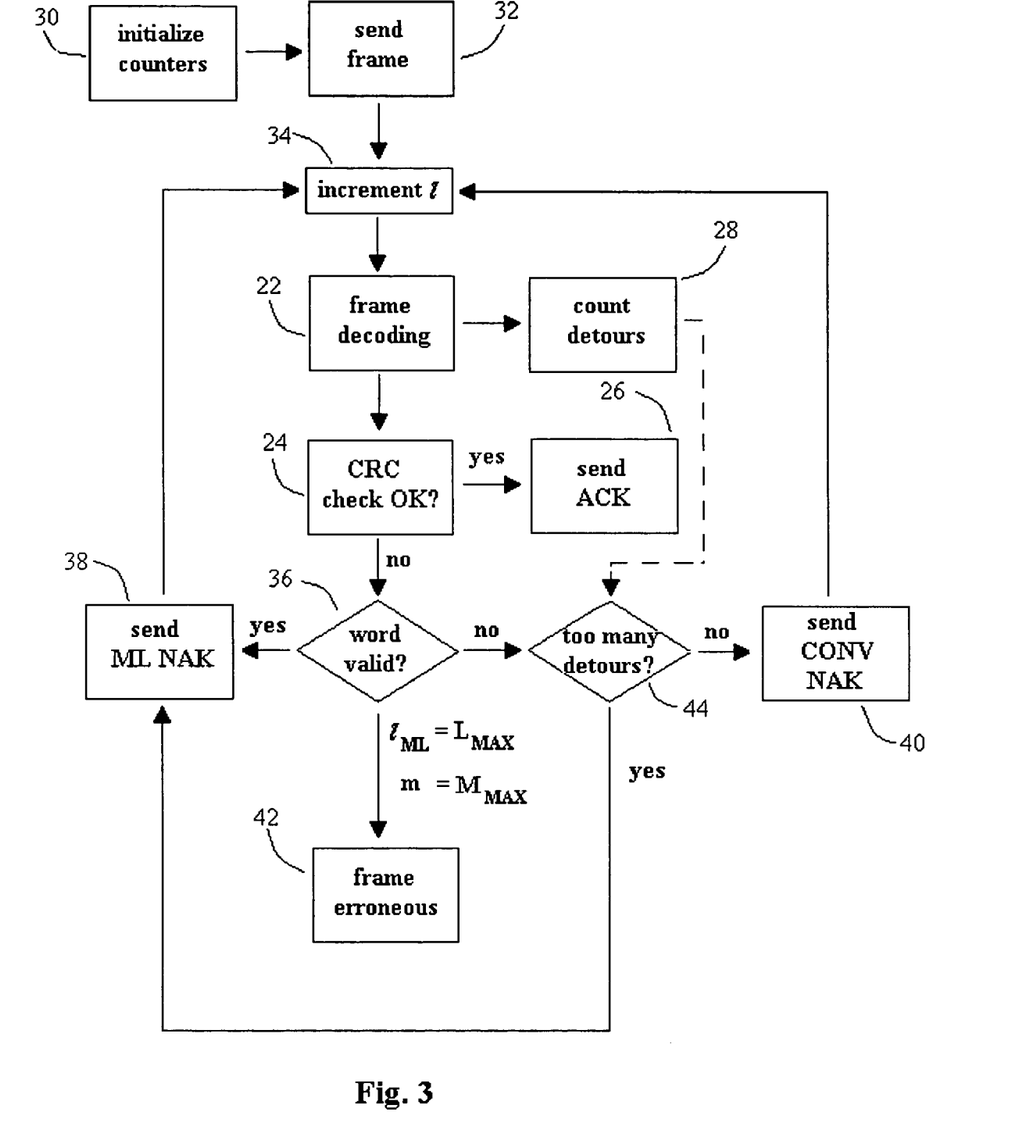
FIG. 3 is a flow diagram showing a method of decoding and detecting errors in data.

In FIG. 3, an embodiment of method carried out by the processor 12 is described, including the operation of the algorithm 20. After the packet has been decoded 22, if the CRC check 24 shows no error, the system sends a positive acknowledgment (ACK) 26 and assumes the packet is error-free. If the CRC check fails, the receiver sends a negative acknowledgment (NAK) to the remote transmitter, upon which an additional set of parity bits is sent. If, after the maximum allowed number of retransmissions, the packet is still erroneous, it is dropped and the problem is reported to the upper layers of the system.

If an error-correcting code can be represented in a trellis form, it can be shown that the BCJR decoding algorithm is bit-wise maximum a-posteriori (MAP) optimum. In one embodiment, the BCJR algorithm 16 operates in three passes: in the first pass, it recursively calculates the probabilities $a_{k-1}(s')$ of arriving at trellis state s' with forward transitions between the states; in the second pass, it calculates the probabilities $\beta_k(s)$ of arriving at trellis state s with backward transitions; finally, it calculates the extrinsic information values $L_e(\hat{x}_k)$ as $$L_e(\hat{x}_k) = \log \frac{\sum_{S+} \alpha_{k-1}(s') \tilde{\gamma}_k(s', s) \beta_k(s)}{\sum_{S-} \alpha_{k-1}(s') \tilde{\gamma}_k(s', s) \beta_k(s)} \quad (1)$$

where the summations are performed over state transitions $S+ = \{(s', s) : x^s_k = 1\}$ and $S- = \{(s', s) : x^s_k = -1\}$, respectively. The $\gamma_k(s', s)$ values are the extrinsic probabilities of transitions between states s' and s defined as $$\gamma_k(s', s) = \exp\left(\frac{L_C}{2} \sum_{i=0}^{n-1} [P_l]_{i,k} a^i_k x^i_k y^i_k\right) \quad (2)$$

where $L_C = 4E_s/N_0$ is the channel reliability factor, $[P_l]_{i,k}$ is the entry in the puncturing matrix corresponding to the ith coded bit of the kth symbol in the lth retransmission. $a^i_k$, $x^i_k$ and $y^i_k$ are entries from $a_l$, $x_l$ and $y_l$, respectively. Correspondence between the values of k, i and l depends on the actual ARQ process realization and cannot be predetermined.

After completing all three passes of the BCJR algorithm 16, the soft values $L_e(\hat{x}_k)$ are fed to a threshold device, which produces the decoded bit values for all information bits and feeds them to the CRC decoder 18.

It was shown previously in the field that, on average, the BCJR algorithm assigns high probability values $\alpha_{k-1}(s')$ to one 'trusted' state for each k and much lower values to the remaining 'untrusted' states. The same is valid for the backward transitions and probabilities $\beta_k(s)$. The high probability states will be depicted using the following notation $$s'_\alpha(k-1) = \underset{s'}{\mathrm{argmax}}\, \alpha_{k-1}(s'), \quad \alpha^{max}_{k-1} = \max \alpha_{k-1}(s') \quad (3)$$

$$s_\beta(k) = \underset{s}{\mathrm{argmax}}\, \beta_k(s), \quad \beta^{max}_k = \max \beta_k(s)$$

There are different possible transitions between the states of a trellis, which correspond to different bit input values $x^s_k$. Between two adjacent states of a trellis there are two possible cases, in which there is a direct transition between $s'_\alpha(k-1)$ and $s_\beta(k)$ (case A), and when there is no such a transition (case B). In the second case, the calculations in equation (1) will, on average, result in lower magnitude of the extrinsic values and an increased probability of bit error. The situation in case B is defined as a convergence error and, based on equation (3), the convergence criterion is formally stated as if $(s'_\alpha(k-1), s_\beta(k)) \in \{S^+, S^-\} \Rightarrow$ convergence at kth bit. (4)

Fulfillment of the above criterion does not ensure the correctness of the decoding, only that the decoder has been able to recreate the transitions which can be associated with a valid codeword. On the other hand, it may happen that even though there have been convergence errors, the set of information bits is decoded without an error. That is why the error-detecting code is necessary to assess whether the error-correcting decoder managed to recover the transmitted sequence without any erroneous information bits.

In the typical situation, the majority of the transitions in the code trellis will be detected properly and the decoder will not have problems with matching the high probability states. However, if, in one of the transitions, the received signal sample is significantly distorted, the decoding algorithm may assign highest probability to a wrong state, which will cause difficulties matching the largest probabilities of $\alpha_{k-1}(s')$ and $\beta_k(s)$. Although such errors may not be very frequent, the recursive nature of the BCJR algorithm propagates them for many symbols. Even when only one code symbol is heavily distorted this can cause the departure of the forward and backward transitions from the correct all-zero codeword transitions.

When calculations of $\alpha_{k-1}(s')$ are performed, the departure from the all-zero state will cause $s'_\alpha(k-1) \neq 0$ for a few positions k and, similarly, $s_\beta(k) \neq 0$ for a few positions when values of $\beta_k(s)$ are calculated. The result will be a cluster of positions where the convergence criterion (4) will not be satisfied. These clusters are referred to as detours.

Since the BCJR algorithm operates on a bit-by-bit basis, it is quite difficult to calculate the exact length of detours. Unlike in the Viterbi algorithm, it is actually possible for the BCJR probability assignment algorithm to depart from the correct state and return to it without following valid code transitions. It is, however, possible to approximate the average length of a detour in a BCJR decoder as shown in the following paragraphs. Let $$s \underset{\omega \to}{x}$$

be the number of the state following the state co after transmission of information bit x and let $$s \underset{\omega \to}{x}$$

be the number of the state preceding the state X prior to the transmission of x.

A wrong transition occurs when some of the received samples $y^i_k$ from (2) are distorted to the extent that the metric for the correct transition is lower than the metric for the erroneous transition. Using notation from (2) and assuming that the all-zero codeword has been transmitted, the probability of the incorrect transition at the kth symbol after l retransmissions can be evaluated as $$p_e(k, l) = P\left[\frac{\gamma_k(s'=0, s=0)}{\gamma_k(s'=0, s=s_{0 \to 1})} < 1\right] \quad (5)$$

$$= P\left[\sum_{i=0}^{n-1} [P_l]_{i,k} a^i_k x^i_k y^i_k < 0\right].$$

Based on equation (5), the average length of the detour for a given puncturing period p can be calculated using Bayes formula and total probability theorem as $$\overline{M}(l) = \qquad (6)$$

$$\frac{1}{\sum_{j=0}^{p-1} \prod_{\substack{k=0, \\ k \neq j}}^{p-1} p_e(j, l)(1 - p_e(k, l))} \sum_{j=0}^{p-1} M_j(l) \prod_{\substack{(k=0), \\ k \neq j}}^{p-1} p_e(j, l)(1 - p_e(k, l)))$$

where expected detour lengths $M_j(l)$ is averaged over conditioned on erroneous transition position j. General evaluation of equation (6) is difficult since it depends on puncturing state and channel state variables $a^i_k$ at different transmission instants influencing $p_e(k, l)$ and terms $M_j(l)$ which depend on the code structure, puncturing period p and the structure of matrices $P_l$. There is a method, which is described below, of approximating $M_j(l)$, which can be used to calculate the average length of the detours where the convergence criterion is not met.

Various known codes may be used for encoding the transmitted data, including convolutional codes and rate compatible punctured codes (RCPC). In RCPC, all codewords of higher rate consist of subsets of bits of codewords belonging to the lower rate codes and requires a set of puncturing matrices $P_l$. Any puncturing matrix for higher rate must have 1s only at the subset of the positions of 1s in the puncturing matrix for the lower rate codes. If only one additional bit per period p can be added to the subsequent transmitted sequences, the number of columns in $P_l$ specifies the granularity of the rates $R_l$, allowing the set of available rates to be chosen as $$R_l = \frac{p}{p+l}, \quad l = 0, 1, 2, \ldots p(n-1). \quad (7)$$

The generation of the puncturing matrices may be done by a conventional exhaustive search, where a given criterion (for example minimum Hamming weight) is used to evaluate every possible matrix $P_l$ for each value of l. To provide optimal solution, the analysis should be performed for p=N, but the complexity of such an approach is prohibitive. Therefore, it is common to choose the puncturing period in the order of 4-16.

There exist different criteria for choosing the puncturing patterns of the RCPC for use in a conventional application of a BCJR algorithm. For example, if the CRC check fails, a set of N/p evenly spaced bits spanning the whole frame is requested. In this way, the lower rate codeword is likely to have enough redundancy for the current channel state and can be decoded without errors. Such an approach is best suited to simpler decoding algorithms, such as the Viterbi algorithm, where it is difficult to reliably locate the probable cause of the problem causing failing of the CRC check and the systems where the feedback bandwidth is very limited (since only one-bit NAK is needed).

Although the conventional approach fails to give consistent optimal performance, it may be used as part of a process to obtain better performance in HARQ transmissions. During the operation of an HARQ algorithm, the operating point of the encoder (the value of $R_l$) is chosen in such a way that the correct decoding can be performed with the minimum of redundancy. Hence, for a given SNIR, the HARQ algorithms are usually initialized at a point when the rate of the code only barely guarantees successful decoding. As a result, if the BCJR algorithm is used, some frames will be not be decoded correctly and will contain convergence errors. Such errors cause lowered reliability of the output, which can be directly coupled to higher incidence of errors. Hence, if the system operates close to the optimal rate, convergence errors will be few, and processor 12 may be used to detect the detours and request only the few bits needed to correct them.

An embodiment of the processor 12 incorporating algorithm 20 works as follows. Each frame is divided into sub-blocks of length M. If the decoding 22 of the received signal fails the CRC check 24, processor 12 starts by counting the number of convergence errors within each of the N/M sub-blocks. After that, sub-blocks with the highest number of convergence errors are selected and their identification numbers are sent to the remote transmitter in the NAK message. The remote transmitter then selects the previously punctured parity bits that belong to the sub-blocks selected by the decoder 16 and forwards them to the receiver 14. In this way, the additional redundancy is concentrated in the 'trouble spots', tending to bring the decoder 16 to converge to the right solution. Note that, as opposed to the conventional puncturing criterion, there is no predefined sequence of additional bit transmissions and there is a requirement for higher throughput in the feedback link to accommodate the addresses of the requested sub-blocks. This is addressed in more detail below.

The processor 12 uses an adaptive approach where the ARQ process starts with the conventional approach of requesting the additional bits that span the codeword length. Only when the decoder is on the brink of convergence, the following requests are based on the convergence criterion. Moreover, if there are no convergence errors but the CRC check fails, the conventional algorithm is used since there are no specific erroneous sub-blocks to be requested from the remote transmitter. To allow such a distinction, the method introduces two types of NAK messages. The first, ML NAK, is simply a one bit message requesting another set of parity bits from the predefined queue. The second, CONVERGENCE NAK, specifies the actual positions of the subblocks to concentrate the additional parity bits on. The processor 12 may use varying lengths of additional redundancy blocks.

In addition to the previous definition of the general retransmission index l, two counters $l_{ML}$ and m are introduced, containing the number of requested retransmissions after ML NAK and the total number of requested bits, respectively. The counters are limited to values $L_{MAX}$ and $M_{MAX}$ and, if any of these values is reached without a positive CRC check, the frame is declared erroneous and higher communication layers are notified of the problem. A parameter Q is also used, which specifies the maximum number of sub-blocks containing detours for which CONVERGENCE NAK is issued. In step 28, the number of detours is counted.

Figure 6:
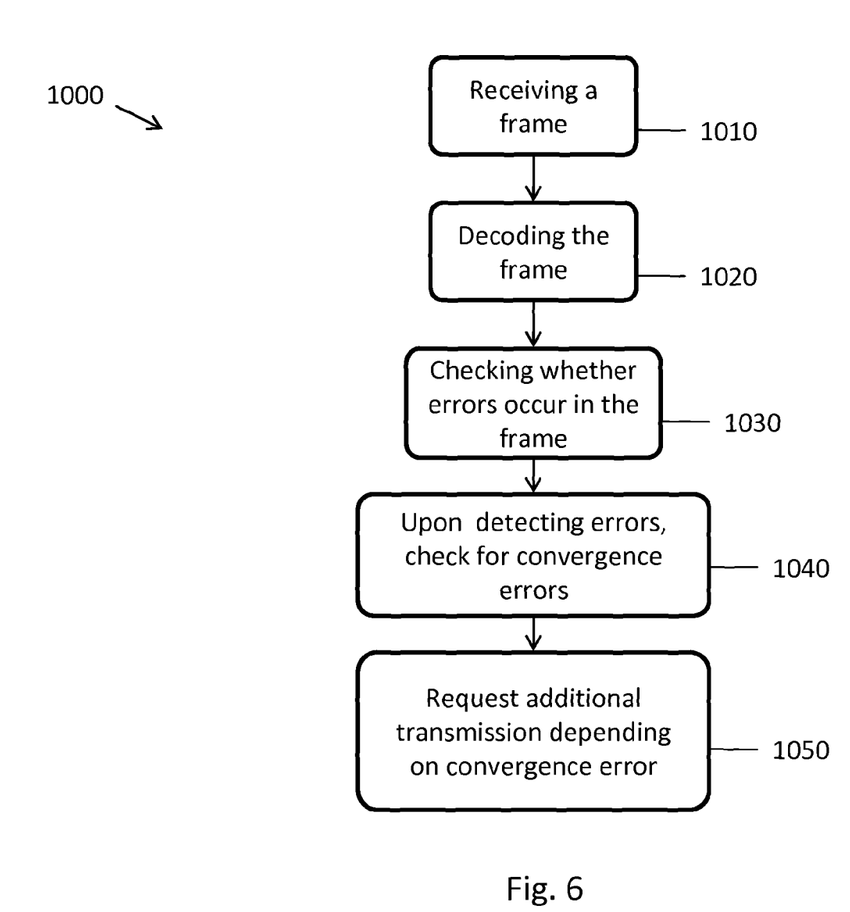
FIG. 6 shows a flow chart showing a method for performing a HARQ transmission within a communications system.

FIG. 6 shows a flow chart 1000, exemplifying the method, in which the method comprises receiving 1010 a frame comprising bits encoded with a trellis code; decoding 1020 the frame with forward and backward passes through states of the trellis code to yield a set of probabilities of the states of the trellis code; checking 1030 whether errors occur in the frame; upon detecting errors in the frame, checking 1040 whether the frame contains convergence errors, where a convergence error occurs when there is no direct transition between the state with the highest probability of the transitions in the forward pass and the state with the highest probability of the transitions in the backward pass; and requesting 1050 an additional transmission of bits depending on properties of the convergence errors.

FIG. 3 illustrates the operation of the processor 12 as follows:
1) In step 30, initialize the general retransmission counter l=0, the ML NAK retransmission counter $l_{ML}$=0 and the retransmission bit counter m=0.
2) In step 32, send the frame consisting of N information bits with initial rate $R_0$.
3) In step 34, increase l by 1. In step 22, decode the frame using the BCJR algorithm.
4) In step 24, perform the CRC check. In step 26, if the frame is error-free send ACK. STOP. In step 36, the following decisions are made:
5) If the frame is erroneous, count the convergence errors in all N/M sub-blocks.
6) If there are no convergence errors and $l_{ML}<L_{MAX}$, increment $l_{ML}$ by 1, increment m by the number of requested bits, send ML NAK 38. After receiving the additional bits, repeat from step 3).
7) In step 44, if the number of erroneous sub-blocks is larger than Q and $l_{ML}<L_{MAX}$, increment $l_{ML}$ by 1, increment m by the number of requested bits, send ML NAK 38. After receiving the additional bits, repeat from step 3).
8) Also in step 44, if the number of erroneous sub-blocks is less than or equal to Q, and if m<$M_{MAX}$, increment m by the number of requested bits in sub-blocks containing convergence errors and send the CONVERGENCE NAK 40 with indices of all such blocks to the remote transmitter. After receiving the additional bits, repeat from step 3).
9) If $l_{ML}=L_{MAX}$ or m=$M_{MAX}$ declare the frame erroneous 42. STOP.

The basic design parameter of any RCPC is the puncturing period p, which determines how many additional bits are sent after every ML NAK. From (7), one can see that the higher p, the larger the number of available rates and, correspondingly, the better use of the channel bandwidth. Increasing p, however, increases the complexity of the system and may increase delays since more retransmissions are typically needed to reliably decode each frame. The second algorithm parameter is the length of the sub-block M, which is assumed to span an integer number of periods p and be a divisor of N. When designing the algorithm carried out by the processor 12, the sub-block length M should not be too small since too high granularity could make the remote transmitter transmit additional bits to areas located far away from the actual spot where the erroneous transition occurred (also the feedback rate would be very large). On the other hand, increasing the number M will also cause problems since too long sub-blocks decrease the benefits of the localized convergence correction. Based on the results of the analysis from above, in an embodiment of the method, M may be chosen so that it is approximately equal to the mean length of the detour $\overline{M}(l)$ in the BCJR decoder for the given length of the puncturing period p. A more detailed discussion can be found below.

The other parameters are specified as $$L_{MAX}=p$$

$$M_{MAX}=N(n-1)$$

$$Q=N/p \quad \quad (8)$$

where $L_{MAX}$ is the typical parameter for conventional RCPC with no repetitions, $M_{MAX}$ is equal to the maximum number of parity bits in the code, and Q limit is set in such a manner that the number of bits requested by a CONVERGENCE NAK cannot be larger than the number of bits sent after ML NAK.

Figure 4:
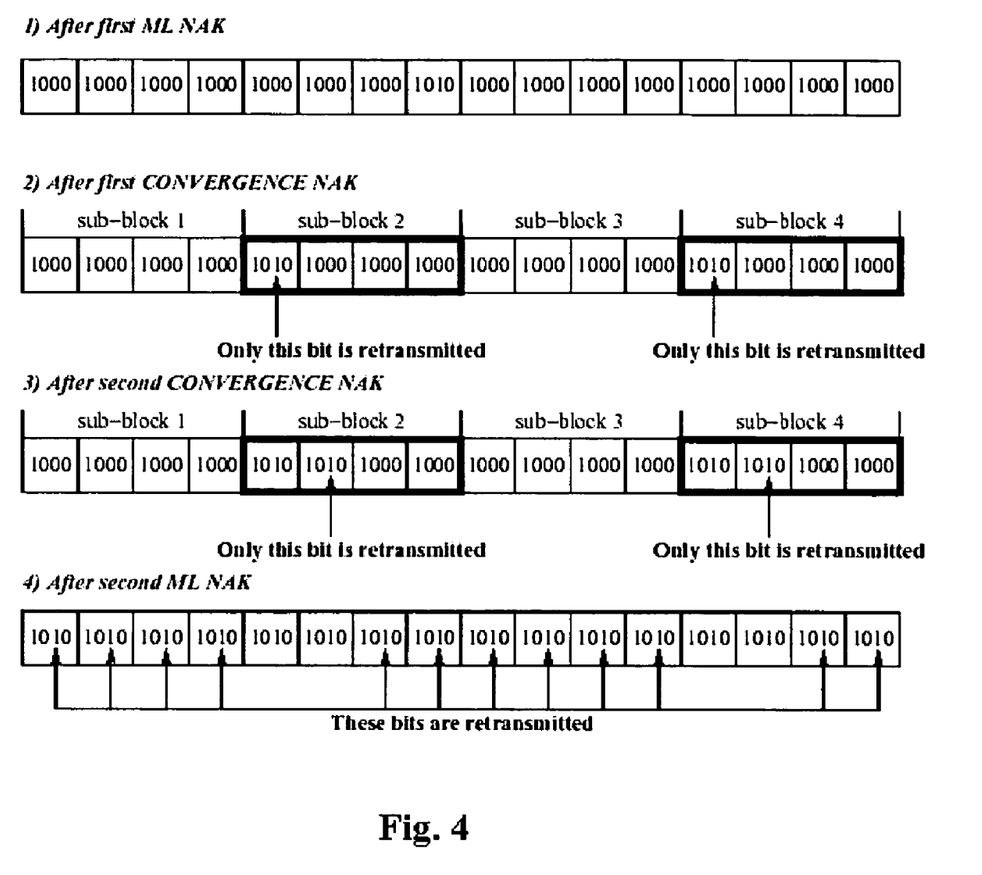
FIG. 4 shows a bit retransmission mechanism requested during operation of the processor of FIG. 2 in which thick lines represent sub-blocks with convergence errors.

The parity bits sent after CONVERGENCE NAKs follow the puncturing pattern rules established for the code, albeit they are concentrated in certain areas instead of being spread over the whole frame. In this mechanism, shown in FIG. 4 it is assumed that after the first ML NAK, convergence errors are detected in some sub-blocks and two consecutive CONVERGENCE NAKs are issued before the system recognizes that one more ML NAK is needed. Within each sub-block, the puncturing pattern for one period is repeated sequentially over all periods until one of three possible cases occurs: a) all bits within the sub-block are transmitted; b) the decoder reports positive CRC check; c) ML NAK is issued. In the last case, the additional bits are transmitted for all periods except the ones already filled after previous CONVERGENCE NAKs. At the remote transmitter side, the encoder must buffer all unsent parity bits and maintain a local copy of counters $l_{ML}$ and m so that no previously sent bits will be repeated in consecutive transmissions. By this mechanism, the actual number of additional bits sent in consecutive transmissions in adaptive HARQ can never be higher than N/p.

In an embodiment of the method a typical parallel rate 1/3 turbo encoder is used with two identical RSC encoders [$g_1$(D), $g_2$(D)] connected by an interleaver of size N. After encoding, the stream of the systematic bits $x^s_k$ is left unchanged while the parity bits $x^p_k$ are punctured so that the overall code rate is equal to $R_l$. For every available rate, the puncturing pattern is defined by a 3×p puncturing matrix $P_l$ with the first row (corresponding to the systematic bits) filled with 1s. At any given retransmission instant, streams of parity bits from both component codes are sent.

In an embodiment of the method the classical turbo decoding procedure is used with the additional CRC check after each decoding iteration. If there are any errors, the decoding continues until the maximum number of allowed iterations $I_{MAX}$ is reached. At this point, the convergence errors are calculated separately for both component codes and the algorithm explained in the previous sections is employed. The extrinsic values of the turbo decoder are reset after each retransmission, although retaining some of them from previous iterations may improve the convergence properties.

There exists a number of puncturing matrix optimization algorithms that can be implemented for turbo codes. The two best approaches seem to be optimization of the average distance spectrum (ADS) of the turbo code and optimization of the component codes both of which have been previously proposed.

To compare this method to the optimal weight spectrum approach, the puncturing pattern for parity bits of the first and second component codes is calculated based on the known method for puncturing periods p=4, 8, 16. The choice of this method was motivated by the better results as compared to the ADS method and its much lower computational complexity (especially for larger periods p). The puncturing pattern has been found to be identical for both component codes.

A brief discussion of the variables used to compare the HARQ schemes follows. The average system throughput is defined as $$R = (1-FER)\overline{R}_{end} \quad (9)$$

where $\overline{R}_{end}$ is the average rate of transmission at the end of the HARQ process, when frame was decoded perfectly or the maximum number of retranmissions was reached. Moreover, define $N_p(l)$ as the number of additional transmitted parity bits in the lth retransmission, and L as the number of total ARQ transmissions before the decoder converges to the error-free solution or the retransmission counters reach their maximum values. The average number of retransmitted bits, $\overline{N}_p = E_l[N_p(l)]$, is calculated by averaging the lengths of additional blocks resulting from ML NAKs and CONVERGENCE NAKs (note that the retransmission lengths after the latter can be one or two orders of magnitude lower than in case of the ML NAKs). The average number of ARQ transmissions, $\overline{L}$, is calculated by averaging transmission counters for all transmitted data packets.

Testing has shown that the proposed algorithm 20 outperforms the conventional HARQ at practically all $Es/N_0$ and p values (although the gains at p=16 are marginal). The gains are especially visible for lower values of p since the adaptive HARQ is able to 'fill' plateaus of the throughput curve resulting from discrete sets of available rates. When p=16, the set of available rates becomes quite large even for the conventional HARQ so the gain of the adaptive HARQ is less prominent.

Figure 7:
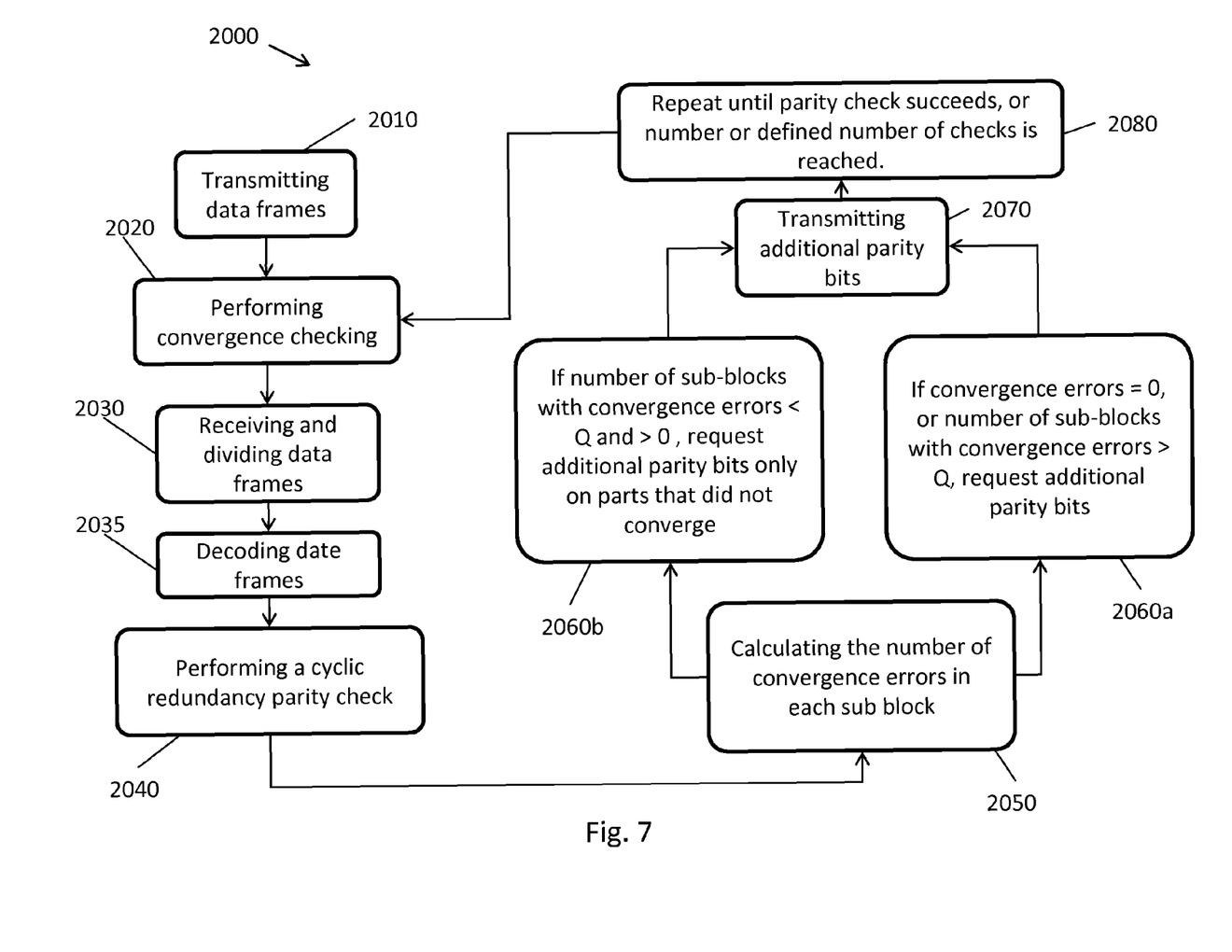
FIG. 7 shows a flow chart of operating a communication system.

FIG. 7 shows a flow chart 2000 exemplifying the method of operating a communications system, in which the method comprising: transmitting 2010 data frames in which each data block is appended with cyclic redundancy check parity check bits and encoded using a forward error correcting code; performing convergence checking steps 2020 of: receiving and dividing 2030 the data frames into sub-blocks; decoding 2035 the data frames by an algorithm that detects transitions between states of a trellis code; performing 2040 a cyclic redundancy parity check; if the cyclic redundancy parity check fails, calculating 2050 the number of convergence errors in each sub-block, where a convergence error occurs when the transitions for a bit are invalid; after calculating the number of convergence errors, (A) requesting 2060a a transmission of additional parity bits evenly distributed in a frame if there are no convergence errors or if the number of sub-blocks containing convergence errors is larger than a threshold Q, or, if the conditions of step A do not occur, (B) requesting 2060b transmission of additional parity bits concentrated on parts of the trellis code that did not converge; and transmitting 2070 the additional parity bits; and repeating 2080 the convergence checking steps until the cyclic redundancy parity check succeeds or a define number of convergence checking steps is reached.

By using the algorithm 20 in the system with p=4, one can obtain throughputs equivalent to the conventional HARQ with p=8, but with one fewer transmission on average. The delay reduction becomes very significant when the adaptive HARQ is used with the period p=8. The throughput of such a system is equivalent to the conventional system with p=16 but the number of retransmissions required for correct decoding is reduced by almost 50%. Further examining has shown for the same p, the adaptive HARQ algorithm increases $\overline{L}$ by approximately 1 transmission (except for very low SNIR values and p=4). The gains in throughput result from much shorter retransmission blocks. For p=4, the average length of the retransmitted blocks is reduced by up to 40%, which compensates the slightly increased number of retransmissions.

The retransmission length varies for different SNIR values and puncturing periods, as opposed to the conventional algorithm where the retransmission lengths remain identical. The average throughput of the tested algorithms 20 with asynchronous retransmissions has similar behavior of the throughput, which is consistently larger for adaptive HARQ. Since this type of channel model is most likely to appear in practice, the results show that the adaptive HARQ system can be successfully implemented in practical systems.

For all channel types, the optimum set of parameters for the adaptive HARQ is identical for a given p, which makes the system very robust and well-suited for most realistic channels. The optimum set of parameters (p,M=2p): (4,8), (8,16) and (16,16) is almost in full accordance with the previous and following analysis. The disparity for p=16, where optimum set is equal to (p,M=p), stems from the fact that already at $l_{ML}$=2, the puncturing pattern becomes similar to a system with p=8, as the first two sets of parity bits are separated by 7 positions.

In general, the adaptive HARQ system is preferable if the bandwidth in the feedforward link is the main constraint but the system can transmit more information in the feedback link instead. Simulations that were performed assumed that each requested sub-block would involve $\log_2(N/M)$ bits. In addition, to lower the feedback rate, it is assumed that if the number of requested blocks is larger than N/(2M), the indices of the converged blocks are transmitted instead.

The adaptive HARQ increases the feedback link burden up to approximately $N_{feedback}$=30-40 bits for p=8, 16 and 60-80 for p=4. These numbers are, however, reasonable since, even in the case of 1 bit ML NAKs, much longer packets are sent in practical systems (these include header bits, medium access control bits etc.). The actual feedback burden will thus not increase much by sending additional sub-block address bits. Moreover, sub-blocks that have not converged are usually adjacent which allows easy compression of the information about their indices.

An embodiment of a proposed adaptive HARQ system using turbo codes has been shown to outperform the best known weight spectrum criterion previously introduced for the hybrid ARQ systems. The algorithm 20 can improve the throughput by shortening retransmitted sequences while keeping the average number of retransmissions practically the same as in the conventional system. The gains have been shown to be substantial for shorter puncturing periods of the codes, especially with realistic asynchronous retransmission.

A more detailed description of the calculations of $M_j(l)$ follows. To approximate $M_j(l)$ in (6), first note that after the incorrect (k−1)th transition resulting in $s'_\alpha(k-1) \neq 0$, three situations can occur at the following transition k:

1) If $\forall_i [P_l]_{i,k}$=0, it is impossible for the decoder to assign the highest probability to the all-zero state after transition k.
2) If $[P_l]_{i,k} \neq 0$ for only one position i=I, the only situation when the all-zero state will be assigned the highest probability after transition k is when $$s'_\alpha(k-1) = s_{\underset{\rightarrow O}{-1}} \text{ and } a_k^I x_k^I y_k^I < 0,$$

see (5). This means that the probability of returning to the all-zero state from the state $$s_{-1_0}$$

is equal to $P[a_k^I x_k^I y_k^I < 0]$ and 0 for all other states.
3) If $[P_l]_{i,k} \neq 0$ for more than one position i, the return to the all-zero state may occur when $$s'_\alpha(k-1) \neq s_{-1_0}$$

and $$\sum_{i=0}^{n-1} [P_l]_{i,k} a_k^i x_k^i y_k^i < 0,$$

or for $$s'_\alpha(k-1) \neq s_{-1_0}$$

when the following inequality is true $$a_{k-1}(0)\gamma_k(0,0) + a_{k-1}(s_{\rightarrow 0}^{-1})\gamma_k(s_{\rightarrow 0}^{-1},0) > \max_{s \neq 0}[a_{k-1}(s_{\rightarrow s}^1)\gamma_k(s_{\rightarrow s}^1,s) + a_{k-1}(s_{\rightarrow s}^{-1})\gamma_k(s_{\rightarrow s}^{-1},s)]. \quad (10)$$

The intuitive explanation of (10) is that the decoder will return to the all-zero state when the metric $\gamma_k(0,0)$ is so large that even though the state probability $a_{k-1}(0) < a_{max}k-1$, the resulting product $a_{k-1}(0)\gamma_k(0,0)$ will be large enough to assign highest value to the all-zero state in the next step of the BCJR algorithm.

The analysis of (10) is begun by redefining its right side as $$\max_{s \neq 0}[a_{k-1}(s_{\rightarrow s}^1)\gamma_k(s_{\rightarrow s}^1,s) + a_{k-1}(s_{\rightarrow s}^{-1})\gamma_k(s_{\rightarrow s}^{-1},s)]_= \quad (11)$$
$$a_{k-1}(s_{\rightarrow \Omega}^1)\gamma_k(s_{\rightarrow \Omega}^1,\Omega) + a_{k-1}(s_{\rightarrow \Omega}^{-1})\gamma_k(s_{\rightarrow \Omega}^{-1},\Omega).$$

Since there is a maximization operator in (10), one of the states $$s_{\rightarrow \Omega}^1 \text{ or } s_{\rightarrow \Omega}^{-1}$$

must be the same as $s'_\alpha(k-1)$. In practice, $$s_{\rightarrow \Omega}^1 = s'_\alpha(k-1)$$

since opposite situation would require that $$\gamma_k(s_{-1_\Omega},\Omega) \gg \gamma_k(s_{1_\Omega},\Omega),$$

a situation which happens very rarely for all-zero codeword, especially for larger values of SNIR. It is now possible to distinguish between two possible situations:

1) If transition $$(s_{1_\Omega},\Omega)$$

causes all n output bits to be the same as for transition (0, 0), inequality (10) becomes $$\alpha_{k-1}(0)\gamma_k(0,0) + \alpha_{k-1}\left(s_{-1 \atop \to 0}\right)\gamma_k\left(s_{-1 \atop \to 0}, 0\right) > \quad (12)$$
$$\alpha_{k-1}^{max}\gamma_k(0,0) + \alpha_{k-1}\left(s_{-1 \atop \to \Omega}\right)\gamma_k\left(s_{-1 \atop \to 0}, 0\right)$$

and, since $\alpha^{max}_{k-1}$ is usually much larger than other $\alpha_{k-1}(s')$, the probability of fulfilling (12) is approximately equal to 0.
2) If the transition $$\left(s_{1 \atop \to \Omega}, \Omega\right)$$

causes some of the n output bits to differ from bits in transition (0, 0), the inequality in (10) will be given as $$\alpha_{k-1}(0)\gamma_k(0,0) + \alpha_{k-1}\left(s_{-1 \atop \to 0}\right)\gamma_k\left(s_{-1 \atop \to 0}, 0\right) > \quad (13)$$
$$\alpha_{k-1}^{max}\gamma_k\left(s_{1 \atop \to \Omega}, \Omega\right) + \alpha_{k-1}\left(s_{-1 \atop \to \Omega}\right)\gamma_k\left(s_{-1 \atop \to \Omega}, \Omega\right).$$

To discuss inequality (13), assume that the decoder operates just above the convergence point, i.e., statistically only one detour will appear in the decoder and that the transitions $$\left(s_{1 \atop \to \Omega}, \Omega\right)$$

and (0, 0) (or alternatively $$\left(s_{-1 \atop \to \Omega}, \Omega\right) \text{ and } \left(s_{-1 \atop \to 0}, 0\right)$$

cause the output bits to differ at only one position. Based on those assumptions and (2), it is possible to rewrite (13) as $$\alpha_{k-1}(0)e^{\frac{L_C}{2}a_k y_k} > \alpha_{k-1}^{max} e^{-\frac{L_C}{2}a_k y_k} \quad (14)$$

where only statistically large first terms on both sides are kept and inequality is simplified by reducing common terms. For $\alpha_{k-1}(0) \neq 0$, (14) reduces then to $$e^{L_C a_k y_k} > \frac{\alpha_{k-1}^{max}}{\alpha_{k-1}(0)}. \quad (15)$$

The pdfs of probabilities $\alpha_{k-1}(s')$ needed for solving (15) are known. With the assumptions, however, the left side is practically always a few orders of magnitude larger than the right side, which guarantees that the inequality in (15) is almost always fulfilled.

To summarize, in majority of the cases when the BCJR decoder operates on the verge of convergence, a detour is ended at position k when two conditions are fulfilled:

1) If at least two coded bits are transmitted for the symbol k.
2) If $s'_\alpha(k-1)$ is the state from which there is no transition with the same set of n output bits as for transition (0, 0).

Figure 5:
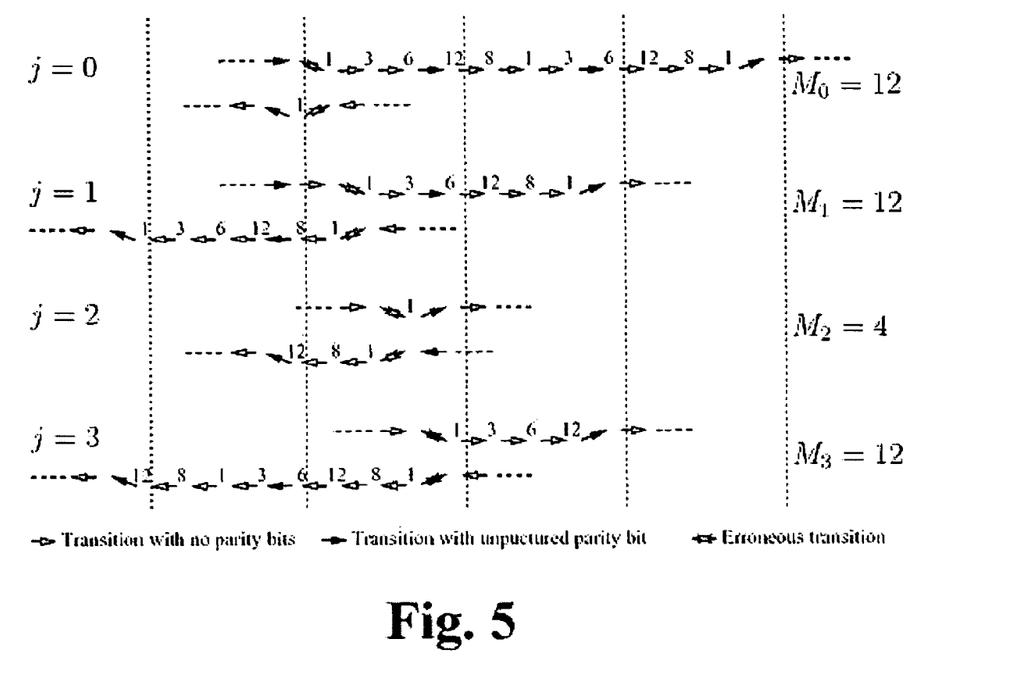
FIG. 5 shows an example of detour calculations.

An example of detour calculations using the method with the (37, 21)$_{oct}$ ode and p=4 is shown in FIG. 5. As mentioned above, the system is assumed to operate at fairly high SNIR so that only one parity bit (last position in the puncturing period) is transmitted, which corresponds to l=2 (one transmission of the systematic bits and one transmission of a set of parity bits). According to the above analysis, the decoder will return to the all-zero state only when the position with the unpunctured parity bit follows high probability state $s'_\alpha(k-1)$ is an element of, {1, 2, 4, 7, 9, 10, 12, 15} since those states are followed by transitions with different sets of output bits than the transition (0,0). Otherwise the decoder continues to assign high probability values to non-zero states in a sequence of 1, 3, 6, 12, 8, 1 . . . . For example, if the erroneous transition happens at j =0, the forward pass of the BCJR algorithm will assign high probability value to states other than the all-zero state for 11 transitions and the backward pass will go back to the all-zero state after only one transition. This will result in the detour length of $M_0$=12 (we skip (l) to simplify notation). After calculating the other detour lengths, it is now possible to average them using (5) and (6) for the given SNIR. Note, that for the higher SNIR values and the only unpunctured parity bit at position j=3, $p_e(3) \ll p_e(0) = p_e(1) = p_e(2)$ and as the result M=(12+12+4)/3=9.33≅2p. Since lower SNIR values will cause more parity bits to be sent, the M≅2p is an approximate upper limit on the average detour length for this code.

In the claims, the word "comprising " is used in its inclusive sense and does not exclude other elements being present. The indefinite article "a" before a claim feature does not exclude more than one of the feature being present.

Immaterial modifications may be made to the embodiments described here without departing from what is covered by the claims.

What is claimed is:

1. A method for performing hybrid automatic repeat request (HARQ) transmission within a communication system, the method comprising repeating the following steps:
   receiving a frame comprising bits encoded with a trellis code;
   decoding the frame with forward and backward passes through states of the trellis code to yield a set of probabilities of the states of the trellis code;
   checking whether errors occur in the frame;
   upon detecting errors in the frame, checking whether the frame contains convergence errors, where a convergence error occurs when there is no direct transition between the state with the highest probability of the transitions in the forward pass and the state with the highest probability of the transitions in the backward pass; and
   requesting an additional transmission of bits depending on properties of the convergence errors.

2. The method of claim 1 in which determining if the plurality of bits contains convergence errors comprises counting the number of convergence errors in one or more sub-blocks of the plurality of bits.

3. The method of claim 2 in which requesting an additional transmission of bits depending on properties of the convergence errors comprises the following steps:
   if there are no convergence errors or if the number of erroneous sub-blocks is larger than a number Q, then sending a negative acknowledgment, requesting a number of bits and receiving a number of bits; and
   if there are convergence errors and the number of erroneous sub-blocks is smaller than or equal to the number Q, then sending a negative convergence acknowledgement, requesting a number of bits and receiving a number of bits.

4. The method of claim 3 in which the method counts the number of times that a number of bits is requested by the method and counts the number of total bits requested.

5. The method of claim 4 in which if the number of times that a number of bits is requested is greater than or equal to a number L or if the number of total bits requested is greater than or equal to a number M, then the plurality of bits is treated as erroneous.

6. The method of claim 2 in which sending a negative convergence acknowledgment further comprises sending the indices of all sub-blocks containing convergence errors.

7. The method of claim 2 in which if there are convergence errors and the number of erroneous sub-blocks is smaller than or equal to the number Q, then requesting a number of bits further comprises requesting only those bits in sub-blocks containing convergence errors.

8. The method of claim 1 in which checking whether errors occur in the frame comprises performing a cyclic redundancy check.

9. The method of claim 1 in which decoding the frame comprises decoding the frame using a BCJR algorithm.

10. A communication apparatus comprising:
a transmitter;
a receiver; and
a processor configured to receive a frame comprising bits encoded with a trellis code, decode the frame with forward and backward passes through states of the trellis code to yield a set of probabilities of the states of the trellis code, check whether errors occur in the frame, upon detecting errors in the frame, check whether the frame contains convergence errors, where a convergence error occurs when there is no direct transition between the state with the highest probability of the transitions in the forward pass and the state with the highest probability of the transitions in the backward pass, and request an additional transmission of bits depending on properties of the convergence errors.

11. A method of operating a communications system, the method comprising:
transmitting data frames in which each data block is appended with cyclic redundancy check parity check bits and encoded using a forward error correcting code;
performing convergence checking steps of:
receiving and dividing the data frames into sub-blocks;
decoding the data frames by an algorithm that detects transitions between states of a trellis code;
performing a cyclic redundancy parity check;
if the cyclic redundancy parity check fails, calculating the number of convergence errors in each sub-block, where a convergence error occurs when the transitions for a bit are invalid;
after calculating the number of convergence errors, (A) requesting transmission of additional parity bits evenly distributed in a frame if there are no convergence errors or if the number of sub-blocks containing convergence errors is larger than a threshold Q, or, if the conditions of step A do not occur, (B) requesting transmission of additional parity bits concentrated on parts of the trellis code that did not converge; and
transmitting the additional parity bits; and
repeating the convergence checking steps until the cyclic redundancy parity check succeeds or a define number of convergence checking steps is reached.

12. The method of claim 11 in which decoding is carried out using a BCJR algorithm.

13. The method of claim 12 in which the data frame includes an N-bit long data block, and the data frame is divided into sub-blocks of length M.

14. The method of claim 13 in which the convergence checking steps comprise searching for valid transitions in each of the sub-blocks between the most reliable states in the forward and backward passes of the BCJR algorithm.

15. The method of claim 11 in which the threshold Q limit is set in such a manner that the number of bits requested by the convergence checking step B cannot be larger than the number of bits resent after convergence checking step A.

16. Apparatus for performing hybrid automatic repeat request (HARQ) transmission within a communication system, the apparatus comprising:
a processor comprising a decoder configured to decode a received frame comprising bits encoded with a trellis code, the decoder configured to decode the received frame with forward and backward passes through states of the trellis code to yield a set of probabilities of the states of the trellis code;
wherein the processor is configured to check whether errors occur in the frame; and upon detecting errors in the frame, check whether the flame contains convergence errors and request an additional transmission of bits depending on properties of the convergence errors; and
wherein the processor is configured to determine when there is no direct transition between the state with the highest probability of the transitions in the forward pass and the state with the highest probability of the transitions in the backward pass in order to determine convergence errors.

17. The apparatus of claim 16, wherein the processor is configured to determine if the plurality of bits contain convergence errors by counting the number of convergence errors in one or more sub-blocks of the plurality of bits.

18. The apparatus of claim 17, where the processor is configured to request only those bits in a sub-block containing convergence errors when the processor determines that the number of erroneous sub-blocks is smaller than or equal to a number Q.

19. The apparatus of claim 16, wherein the decoder is configured to decode frames using a BCJR algorithm.

* * * * *

UNITED STATES PATENT AND TRADEMARK OFFICE
CERTIFICATE OF CORRECTION

| | |
|---|---|
| PATENT NO. | : 7,747,922 B2 |
| APPLICATION NO. | : 11/445608 |
| DATED | : June 29, 2010 |
| INVENTOR(S) | : B. Mielczarek et al. |

It is certified that error appears in the above-identified patent and that said Letters Patent is hereby corrected as shown below:

| COLUMN | LINE | ERROR |
|---|---|---|
| 16 (Claim 11, line 25) | 9 | "or a define number" should read --or a defined number-- |
| 16 (Claim 16, line 12) | 35 | "whether the flame contains" should read --whether the frame contains-- |

Signed and Sealed this
Eleventh Day of January, 2011

David J. Kappos
*Director of the United States Patent and Trademark Office*